INVENTORS
CHARLES E. HASTINGS
BY ROBERT L. CAYOUETTE

Cushman, Darby & Cushman
ATTORNEYS

INVENTORS
CHARLES E. HASTINGS
BY ROBERT L. CAYOUETTE
ATTORNEY

United States Patent Office 3,426,350
Patented Feb. 4, 1969

3,426,350
MOBILE CRAFT POSITION DETERMINATION
UTILIZING ISO-PHASE RADIO NAVIGATION
SYSTEMS
Charles E. Hastings and Robert L. Cayouette, Hampton,
Va., assignors, by mesne assignments, to Teledyne,
Inc., Los Angeles, Calif., a corporation of Delaware
Filed Jan. 3, 1967, Ser. No. 607,057
U.S. Cl. 343—105      6 Claims
Int. Cl. G01s 1/30

ABSTRACT OF THE DISCLOSURE

The following specification discloses a method for determining the position of a mobile craft which employs at least three overlapping radio navigation systems of the iso-phase type. The craft is navigated in such a manner as to determine the phase difference in two of the systems between two points on a common iso-phase line of the third system and the phase change in a different pair of the three systems between two points on a common iso-phase line of the remaining system, the common iso-phase lines intersecting at a given point. The ratios of the phase changes thus determined, provide information from which the position of the given point can be determined. A chart having indices of known position, including the position of the transmitter of the navigation systems, is provided which also includes two families of intersecting iso-ratio lines of position defined by the locus of points of equal ratio. By determining the value of the ratios of phase changes in the manner above-described, the position of the given point, and consequently the mobile craft, is determined by locating the intersection point of the iso-ratio lines corresponding to the value of the ratios determined.

---

This invention pertains to a method and apparatus for position determination.

Several methods and systems are known for guiding a ship, aircraft or other mobile craft in a given zone. For example, systems are known which rely upon the phase angle between cyclic waves transmtited between the mobile craft and fixed stations. The most common type of wave propaagtion is that by electromagnetic radiation or "radio," although propagation by longitudinal compressional waves in the air or water is also possible. These last-mentioned systems are normally termed iso-phase systems because there are imaginary lines along which the mobile craft may be guided such that no change in phase angle occurs as the mobile craft is moved from one position along said line to another position therealong. The present invention pertains to a method and apparatus for unambiguous position determination within a zone covered by at least three differently positioned iso-phase systems.

The present invention is based upon the discovery that if the mobile craft is moved from one point to another point on an iso-phase line of one system and is also moved from one point to another point on an iso-phase line of another system, the position of the mobile craft may be determined without ambiguity by determining the ratio of phase angle changes in the remaining systems between the iso-phase points in the selected systems.

The present invention can be further understood by reference to the accompanying drawings, wherein.

Figure 1:
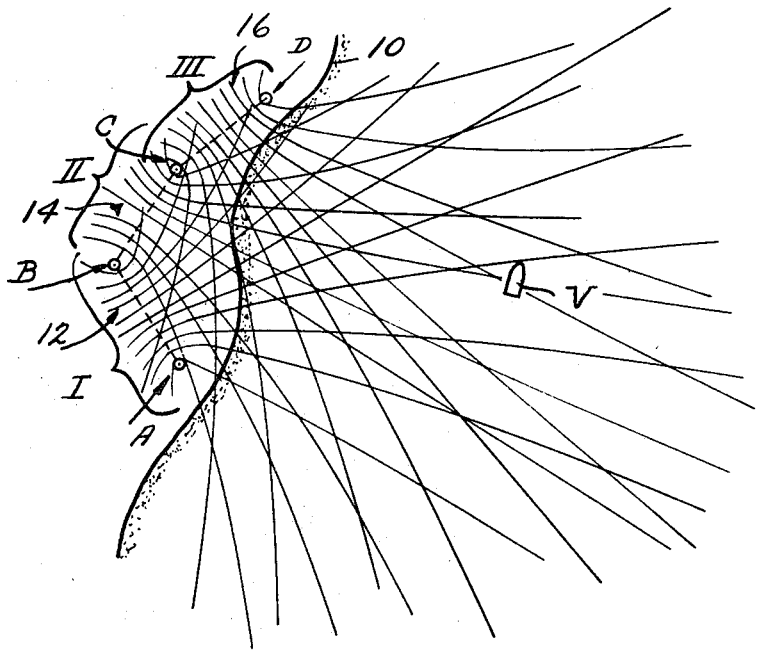
FIGURE 1 illustrates typical iso-phase systems of the hyperbolic type.

In FIGURE 1, V designates a mobile vehicle or craft such as a boat upon a body of water and A, B, C and D illustrate fixed stations for transmitting and/or receiving waves of energy, e.g., radio waves. 10 designates a shore line. Fixed stations A and B serve as the foci of a first iso-phase system I. In practice, such stations are usually several wavelengths apart in terms of the wavelength of the radio or other energy propagated between the same and the mobile craft. As is well known, this gives rise to ambiguity in position determination. One may arbitrarily show iso-phase lines such as those numbered 12. If the mobile craft, equipped with a phase angle measuring device, is navigated along any one of these (or the infinite number of iso-phase lines therebetween), the phase angle measuring device on the mobile craft will not change its reading. However, with the stations A and B separated by more than one wavelength, if the mobile craft is navigated to permit the phase angle measuring device to change its reading under normal usage, that is, with the area in which the craft may be navigated fairly large, the phase angle device will give the same indication for many different positions of the craft within the zone. This has led to a variety of practices for achieving "lane identification," for example, the practice of beginning the navigation pattern from a known point and then counting the number of phase angle meter revolutions to determine in what "lane" the craft is positioned.

Since one iso-phase systtem such as I at best only gives a line of position, it has been the practice to also utilize a second system such as II (stations B and C) to establish crossing iso-phase lines. Lines 14 in FIGURE 1 are iso-phase lines of system II. If a count of lanes (or other lane identification) had been made in both of systems I and II, then a fix could be determined. In this system, however, should the lane count be lost in either system I and II, the positions of the craft cannot readily be unambiguously determined. The primary object of the present invention is to provide a new method whereby absolute fix, without ambiguity, can be obtained within two or more iso-phase systems in order to obtain lane identification. For this purpose, a third iso-phase system III (stations C and D) is provided. The hyperbolic iso-phase lines 16 of this system also encompass the zone within which the mobile craft V is to be moved.

Figure 2:
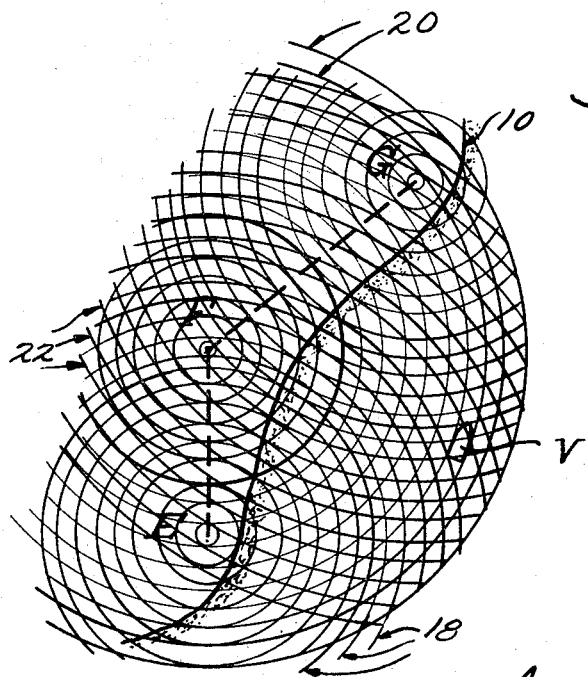
FIGURE 2 shows typical iso-phase systems of the circular type.

Individual hyperbolic iso-phase systems will not be described in detail herein, as they are well known and the subject of many prior patents and other publications, such as Patents Nos. 2,528,141, 2,709,253 and 2,947,984. Before proceeding further with the principles of the present invention, reference is also made to FIGURE 2 which shows a typical circular iso-phase system. In this case, fixed stations E, F and G are on the land side of shore line 10 and mobile craft V is to be navigated in a zone encompassed by each of the systems. Circular iso-phase systems have the characteristic of providing zero phase angle change if the mobile craft is navigated along a curving line which is the arc of a circle with the fixed station as a center. Reference character 18 is used to designate exemplary circular lines of zero phase angle change with fixed station E as a center forming system I. Similarly, circular lines of position exist about fixed stations F and G, forming systems II and III, respectively, these circular lines being designated as lines 20 and 22, respectively, in FIGURE 2. In the circular systems, as in the hyperbolic or other systems, where the distance between the mobile craft and the fixed stations is greater than one wavelength, there can be ambiguity, that is, several positions in respect of each system whereat the phase angle meters will provide like readings. However, in accordance with the principles of the present invention now to be explained, it is possible to obtain an absolute fix within the zone covered by the systems, provided there be at least three systems, whether circular, hyperbolic or other covering the zone.

The method of the present invention may also be used where one or more of the respective iso-phase systems are of different types, e.g. one hyperbolic and two circular, two hyperbolic and one circular, etc.

The present invention makes use of the discovery that in an area covered by three iso-phase systems, a differential displacement along a given iso-phase line of one system at any given point results in a differential change in phase angle in each of the other two systems, the ratio of which is unique for that point. Furthermore, there exists a unique point on each of the other infinite iso-phase lines of the same system at which this same ratio will be true.

It has further been discovered that if iso-ratio lines, which are the loci of points of equal ratio, as said ratio is defined above, are plotted on the iso-phase lines of two of the three systems, the resulting family of intersecting lines makes its possible to unambiguously determine the position of a mobile craft with respect to the fixed transmitting stations. This is possible only if the value of the iso-ratio lines intersecting at a point, the position of which with respect to the craft is known, can be determined. The present invention suggests a method and apparatus whereby the value of intersecting iso-ratio lines at any given point within the zone of interest may be determined.

Figure 3:
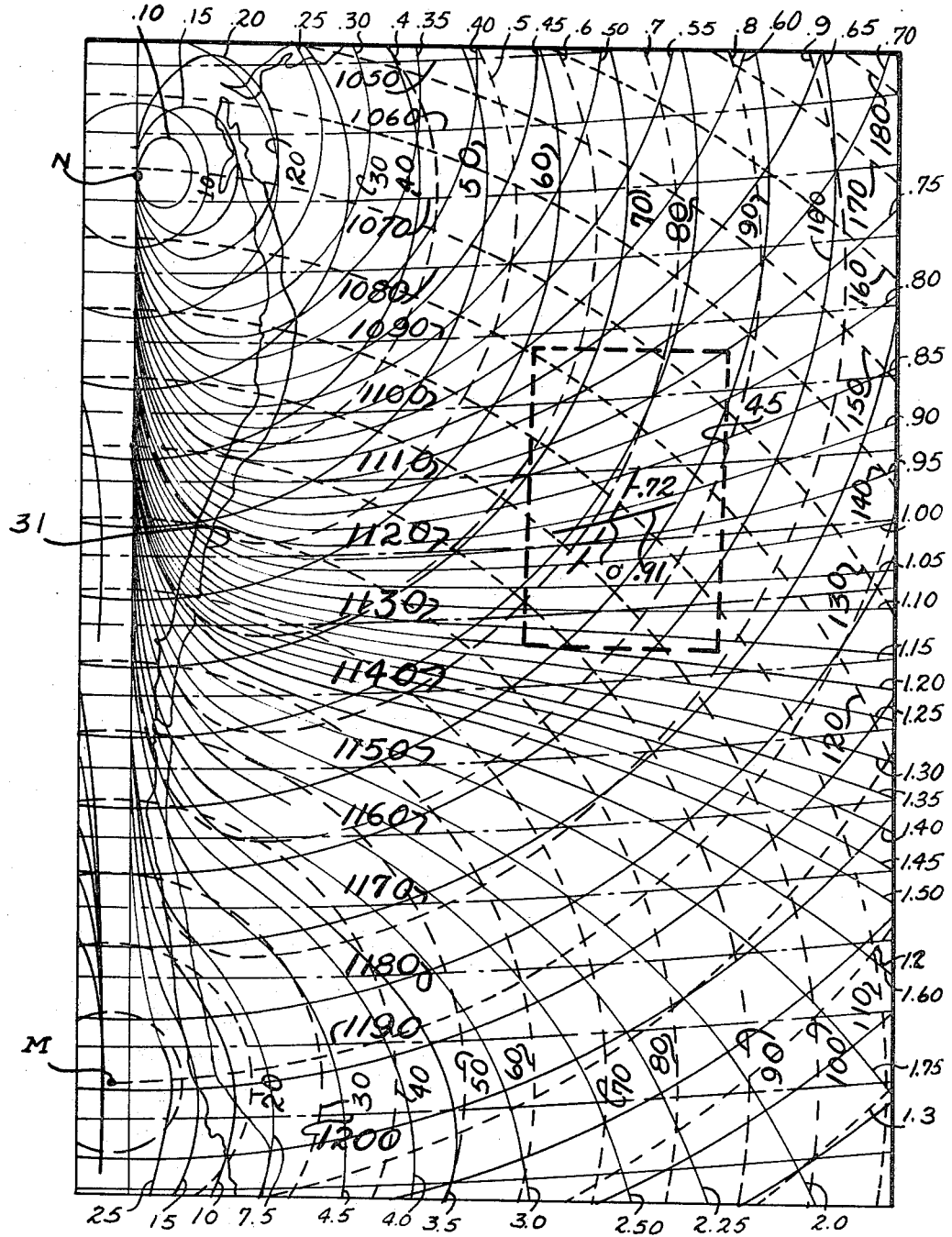
FIGURE 3 is a portion of a coastal survey chart upon which three circular iso-phase systems are illustrated as well as certain iso-ratio lines in two of the three systems.

FIGURE 3 is a representation of a coastal survey chart, line 31 representing the coast line. The circular dashed lines represent certain iso-phase lines of position of a first iso-phase system hereinafter referred to as system I. The circular solid lines and the circular dash-dot lines represent certain iso-phase lines of second and third iso-phase systems respectively. The second and third iso-phase systems will hereinafter be referred to as system II and system III respectively. M is the fixed station of system I and N is the fixed station of system II. The fixed station of system III is not shown. The irregularly curved dashed lines represent certain iso-ratio lines of system III and similarly the irregularly curved solid lines represent certain iso-ratio lines of system I.

Figure 4:
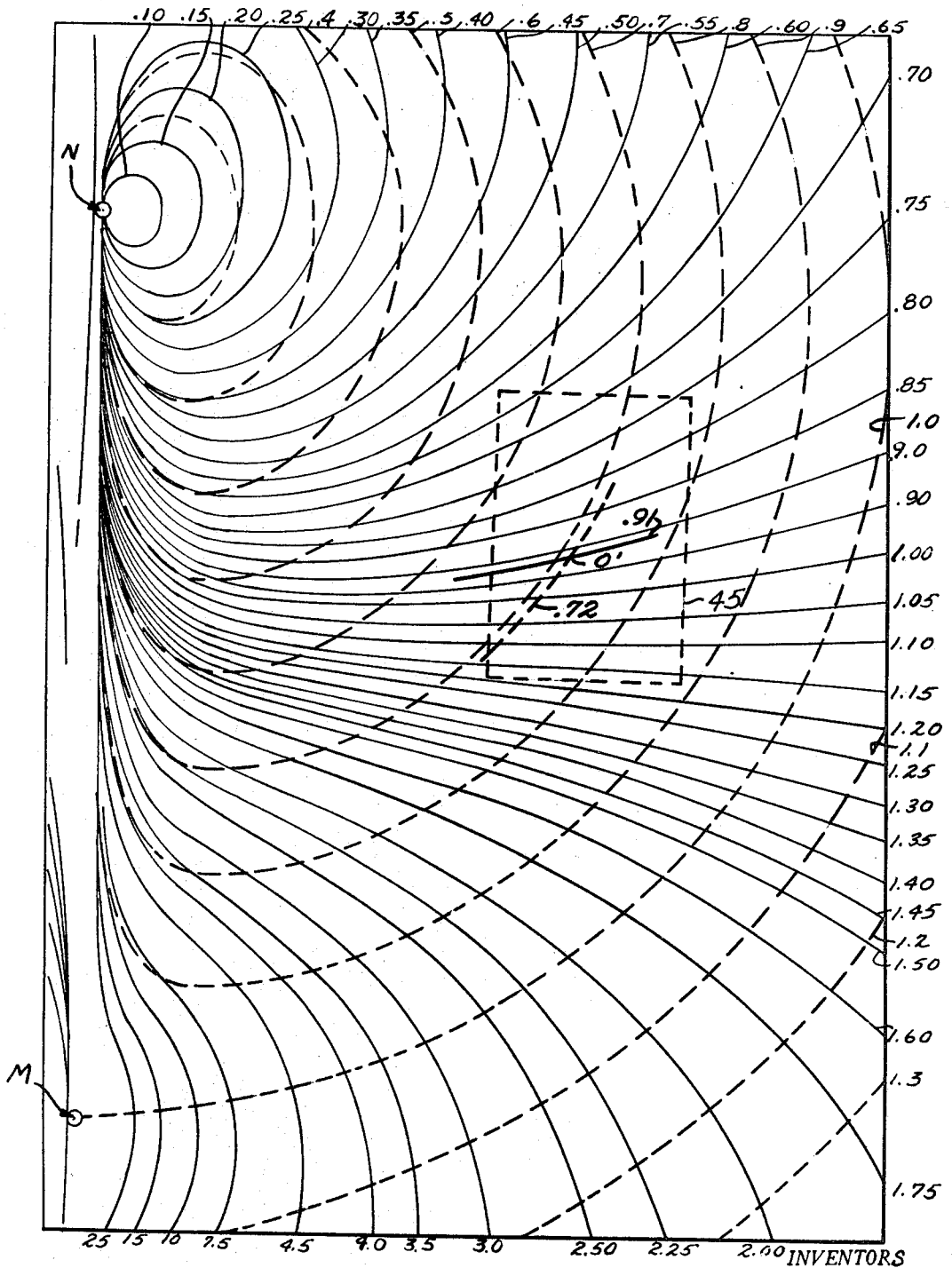
FIGURE 4 shows the same coastal survey chart as FIGURE 3 with only the iso-ratio lines in two of the three iso-phase systems shown thereon.

FIGURE 4 is the same as FIGURE 3 except that only the iso-ratio lines of the iso-phase systems I and III respectively are shown.

Should a mobile craft lose lane identification in one or more of the iso-phase systems, in an area within dotted line 45 (see FIGURES 3 and 4) for example, certain maneuvers of the mobile craft in accordance with the present invention will make possible the determination of the iso-ratio lines passing through a point, the position of which is known with respect to the craft, so that the craft's position may be unambiguously determined with respect to the fixed transmitting stations and thereby obtain lane identification. The numbers located on the various iso-phase lines of FIGURES 3 and 6 indicate the distance, in number of lanes, between each iso-phase line and its respective fixed station. The numbers located in the margin of FIGURES 3 and 4 indicate the value of the ratio which each iso-ratio line represents. The value of the ratios in FIGURE 6 appear on the iso-ratio lines.

Figure 5:
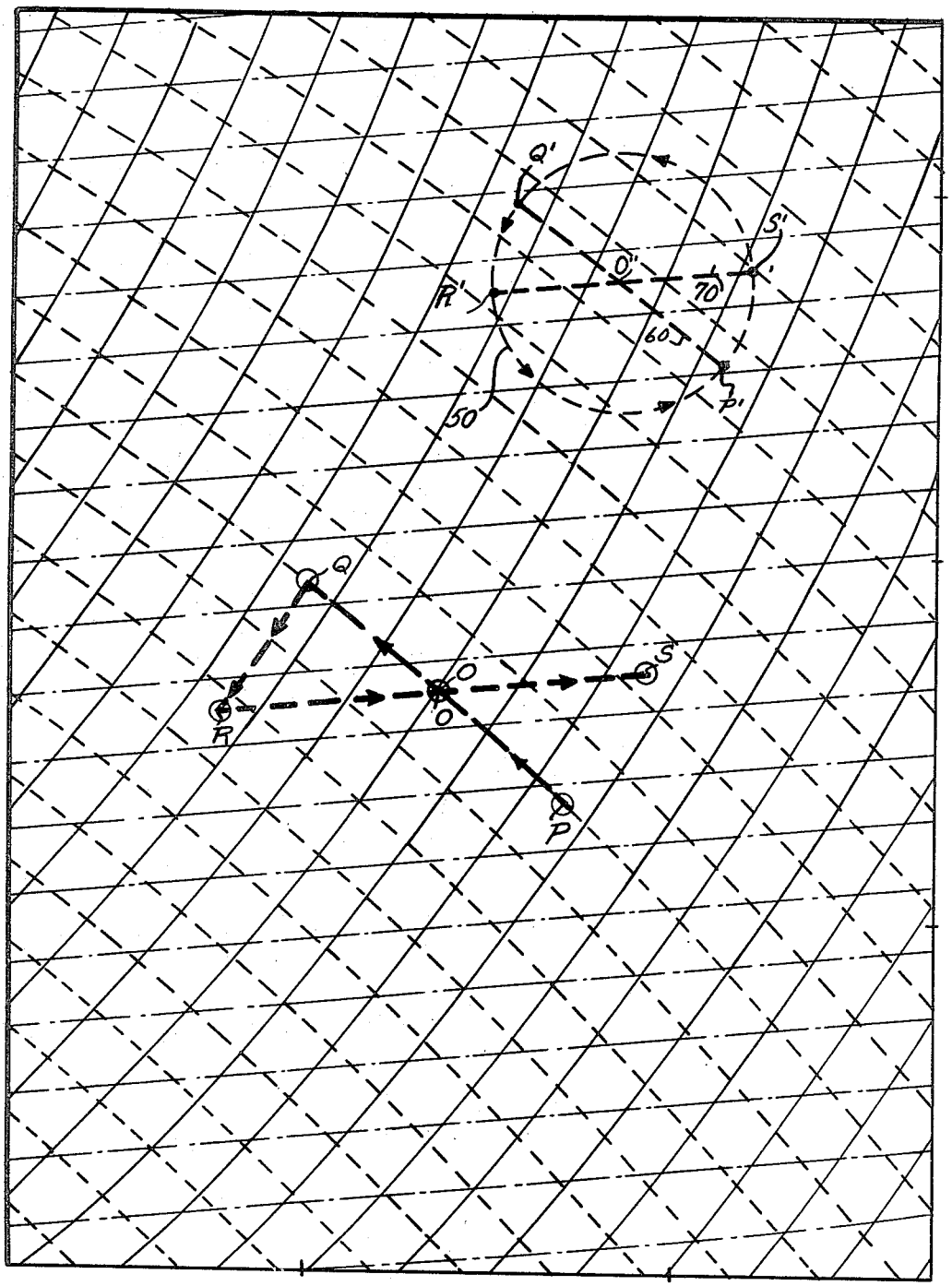
FIGURE 5 shows an enlargement of a portion of FIGURES 3 and 4, except only certain lines are plotted, which are the iso-phase lines of the three circular iso-phase systems.
Figure 6:
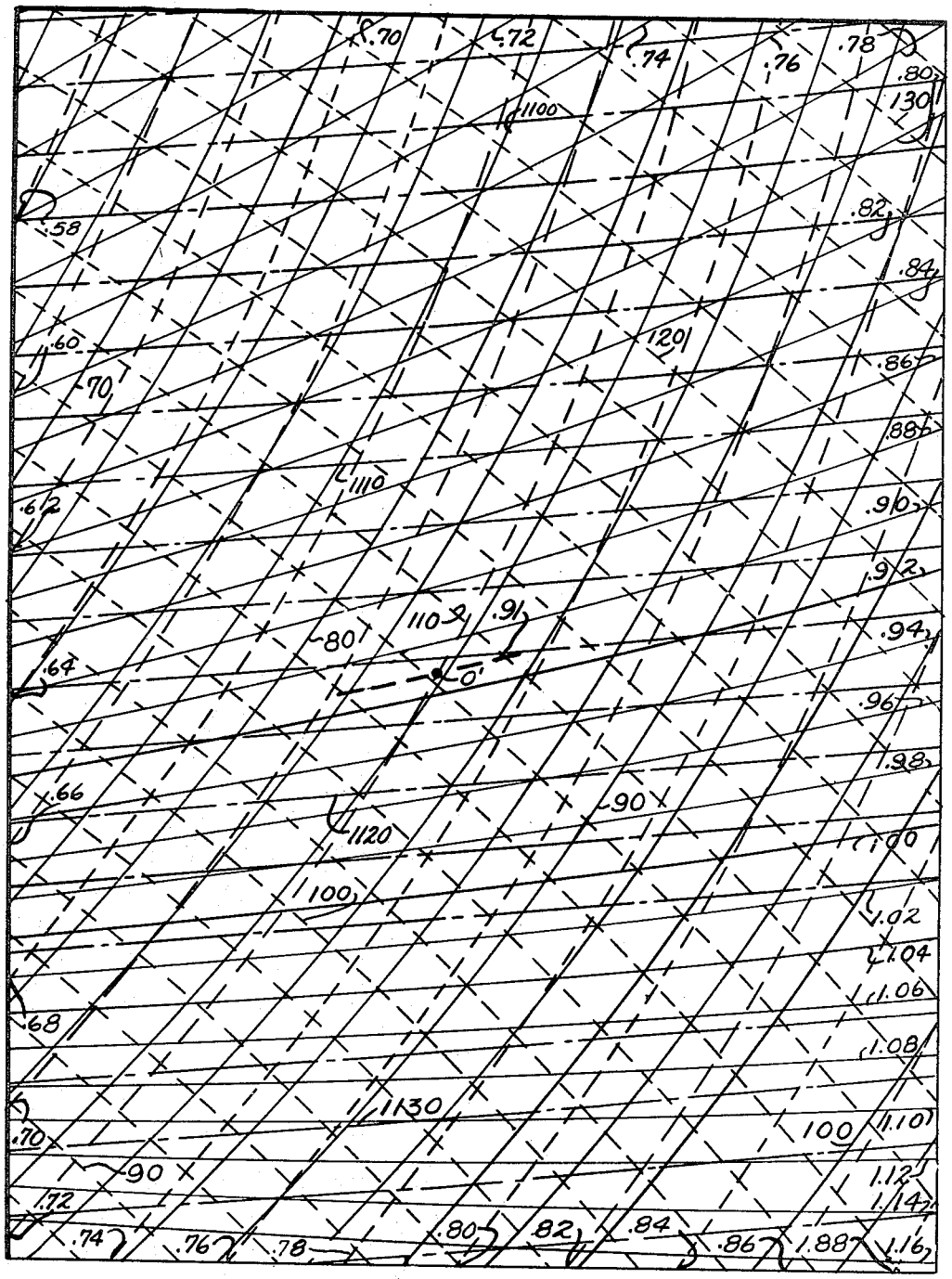
FIGURE 6 shows the same area as FIGURE 5, except with all of the iso-phase lines and the ratio lines of FIGURE 3 illustrated thereon.

In order to better understand the method of the instant invention, an example of its application in determining position within dotted line 45 of FIGURES 3 and 4 will be described in connection with FIGURES 5 and 6, which are enlargements of the area within dotted line 45. In FIGURE 5 only the iso-phase lines of FIGURE 3 are shown. The dashed lines represent certain iso-phase lines of system I, the solid lines represent certain iso-phase lines of system II and the dash-dot lines represent certain iso-phase lines of system III. The iso-phase lines of each system shown in FIGURE 5 represent every other iso-phase line at which the phase angle is zero. In other words, if a craft were moved from one iso-phase line of system I, for example, to the next iso-phase line of the same system, the system I phase meter would indicate a change of 720° or two lanes. In FIGURE 6 all the iso-phase lines and iso-ratio lines passing through the area within dotted line 45 are shown.

Should a mobile craft located within the area encompassed by dotted line 45 lose lane identification in one or more of the iso-phase systems, such a situation being illustrated here by the fact that the numbers indicating the number of lanes from the fixed stations at which each illustrated iso-phase line is located, are omitted from FIGURE 5, the instant invention suggests the following method and apparatus for determining the exact position of a point O, as shown in FIGURE 5, which at all times is known with respect to the mobile craft, to thereby obtain lane identification:

(1) Navigate the craft from a point P through point O to point Q, all of said points being located on the same iso-phase line of system I.

(2) During the passage from P through Q, determine the phase angle change, or number of lanes traversed, in systems II and III. As can be seen from FIGURE 5, the number of lanes traversed in system II between points P and Q is equal to 10 and the number of lanes traversed in system III between said points P and Q is equal to 7.2.

(3) Proceed to a point R, which is shown located on the same iso-phase line of system II as point Q and is also located on the same iso-phase line of system III as is point O. As explained below, R need not be on the same iso-phase line of system II as is Q. Navigate the craft from point R through point O to point S, which is also located on the same iso-phase line of system III as are points O and R.

(4) During the passage from R through S, determine the phase angle change or number of lanes traversed in systems I and II. As can be seen from FIGURE 4, the number of lanes traversed in system II between points R and S is equal to 10 and the number of lanes traversed in system I is equal to 9.1.

(5) Determine the ratio of phase-angle change in system III to the phase angle change in system II between points P and Q. In the present example, this ratio is seen to be .72. Determine the phase angle change in system I to the phase angle change in system II between points R and S. The ratio in this present example is equal to .91.

In the above-described method, if point O is located an equal distance from points P and Q and is also equidistant from points R and S, the above determined ratios will be the value of the iso-ratio lines of systems I and III passing through point O. The exact position of point O may now be determined by locating the intersection of the system III iso-ratio line equal to .91 and the system I iso-ratio line equal to .72 on the chart of FIGURE 4. These iso-ratio lines intersect at a point O', the exact position of which may be determined by measuring, with conventional instruments, the scale distance on the chart of FIGURE 4 between point O' and the fixed stations M and N.

This measurement step may be eliminated if the chart of FIGURE 3 is used. Using the chart of FIGURE 3, once the point O' is located, lane identification is immediately determinable by referring to the lane numbers located thereon. In this present example, and as can be seen more precisely from FIGURE 6, the point O' is located 108 lanes from station M, 84 lanes from station N and 1117 lanes from the fixed station of system III. The exact position of the mobile craft is therefore precisely determined and lane identification obtained if its position with respect to point O is known. Position of the craft with respect to point O can be maintained by keeping an accurate count of the lanes traversed in each system from the beginning of the above described maneuvers or by marking the point O with any suitable means such as a dye or buoy in the case when the mobile craft is a boat or ship on the sea.

As mentioned above it is not necessary that Q and R be on a common iso-phase line of system II. In the above example Q and R were chosen to be on the same iso-phase line of system II so that the number of lanes traversed between R and S in system II would be 10 (the same as between points P and Q) to facilitate calculation of the ratios. In actual practice it is merely necessary that point O bisect the system I iso-phase line between points P and Q and the system III iso-phase line between points R and S. It is further pointed out that the values of phase angle change in the above graphical example are only approximate. In the actual performance of the method of the instant invention by a boat, for example, equipped with three phase meters, one for each system, the exact value of phase angle change would be obtainable.

The above described method is, of course, only an example of a suitable method of determining the exact position of point O and it is to be understood that various other maneuvers may be employed. For example, the craft may be navigated in a circle, the center of which being point O, noting the phase meter readings at four points on the circle, the opposite pairs of which are located on the iso-phase lines of systems I and III which pass through the center of the circle. This method is illustrated in FIGURE 5 by circular path 50, the center of which is O". P' and Q' represent the points on the iso-phase line 60 of system I which passes through the center O" and R' and S' represent the points on the iso-phase line 70 of system III which passes through the center O". In this manner, the value of the iso-ratio lines intersecting at the center of the circle may be determined by calculating the ratio of phase angle changes between the opposite pairs of points located on the circle (P', Q' and R', S'). The phase angle changes in the various systems may be easily determined by employing a counter mechanism on each phase meter to count the number of revolutions thereof.

It is not felt that it is necessary to apply the method and apparatus of the instant invention to the hyperbolic iso-phase system of FIGURE 1 or hybrid systems, e.g. combinations of hyperbolic and circular systems, as one skilled in the art could, in view of the above description, determine lane identification in these systems by use of the method and apparatus described herein.

It is further to be understood that the use of the method of the instant invention is not restricted to two dimensional systems such as described in the above example but is equally well suited for multi-dimensional systems (three or more) such as those used to determine position of an aircraft as disclosed in U.S. Patent 2,527,548 issued Oct. 31, 1950. In such a three-dimensional system, the intersection of three iso-ratio surfaces would be determined as opposed to the intersection of two iso-phase lines as in a two-dimensional system.

The particular charts referred to hereinbefore, are not necessary for the operation of this method. Other devices such as tables correlating ratio intersections to geographical positions may be used, or computers having the information contained in these charts or tables stored therein may also be used to translate the changes in phase angle between the various points into precise, unambiguous geographical positions.

The scope of the present invention is not intended to be limited by the above detailed description. On the contrary, the scope of the invention is to be measured only by the scope of the claims appended hereto.

What is claimed is:

1. A method of position determination of a given point within a zone covered by at least three differently oriented iso-phase systems I, II and III by movements of a mobile craft, comprising the steps of:
   (a) moving the mobile craft from a first point to a second point each on the iso-phase line of system I which passes through said given point and measuring the phase angle change in systems II and III between said first and second points,
   (b) moving the moving mobile craft from a third point to a fourth point, each on the iso-phase line of system III which passes through said given point and measuring the phase angle change in systems I and II between said third and fourth points,
   (c) determining the ratio of said phase angle change in system III between said first and second points to said phase angle change in system II between said first and second points,
   (d) determining the ratio of said phase angle change in system I between said third and fourth points to said phase angle change in system II between said third and fourth points,
   (e) determining the position of said given point by locating the position in said zone at which both of said ratios may be obtained.

2. A method of position determination of a mobile craft within a zone covered by at least three differently oriented iso-phase systems I, II, and III each of which has no more than one straight iso-phase line of position, comprising the steps of:
   (a) moving the mobile craft from a first point to a second point each on a common iso-phase line of system I and measuring the magnitude of phase angle change in systems II and in system III, between said first and second points;
   (b) moving the mobile craft from a third point to a fourth point each on a common iso-phase line of system III and measuring the magnitude of phase angle change in system I and system II, between said third and fourth points;
   (c) determining the ratio of said phase angle change in systems III to the phase angle change in system II between said first and second points;
   (d) determining the ratio of said phase angle change in systems I to the phase angle change in system II between said third and fourth points;
   (e) maintaining knowledge of the position of all of said points and the mobile craft relative to one another; and,
   (f) determing the position of said mobile craft relative to the point within the zone at which both of said ratios may be attained.

3. A method as in claim 2 which includes finding the position of the mobile craft relative to the intersection of ratio lines of position upon a chart having thereon indices of known objects and first intersecting lines of position being the loci of points of like ratio determined by taking the ratio of phase angle changes in iso-phase systems II and III between pairs of points on iso-phase lines of system I and second intersecting lines of position being the loci of points of like ratio determined by taking the ratio of phase angle changes in iso-phase systems I and II between pairs of points on iso-phase lines of system III.

4. The method of claim 2 wherein said common iso-phase line of system I and said common iso-phase line of system III intersect, the point of intersection being equidistant from said first and second points and also being equidistant from said third and fourth points.

5. The method of claim 4 wherein said third point is on the same iso-phase line of system II as said second point.

6. The method of claim 4 wherein said craft is moved in a circle passing through said first, second, third and fourth points, whereby the value of said ratios at the center of said circle may be determined.

References Cited

UNITED STATES PATENTS 2,855,595  10/1958  Koeppel _____ 343—105
3,087,155  4/1963  Dike et al. _____ 343—105 X RODNEY D. BENNETT, *Primary Examiner.*

M. F. HUBLER, *Assistant Examiner.*